H. M. SMITH.
MEANS FOR HOLDING FORMED METAL PIECES WHILE THEY ARE BEING ELECTRICALLY WELDED.
APPLICATION FILED SEPT. 30, 1918.
1,351,445.
Patented Aug. 31, 1920.
2 SHEETS—SHEET 2.
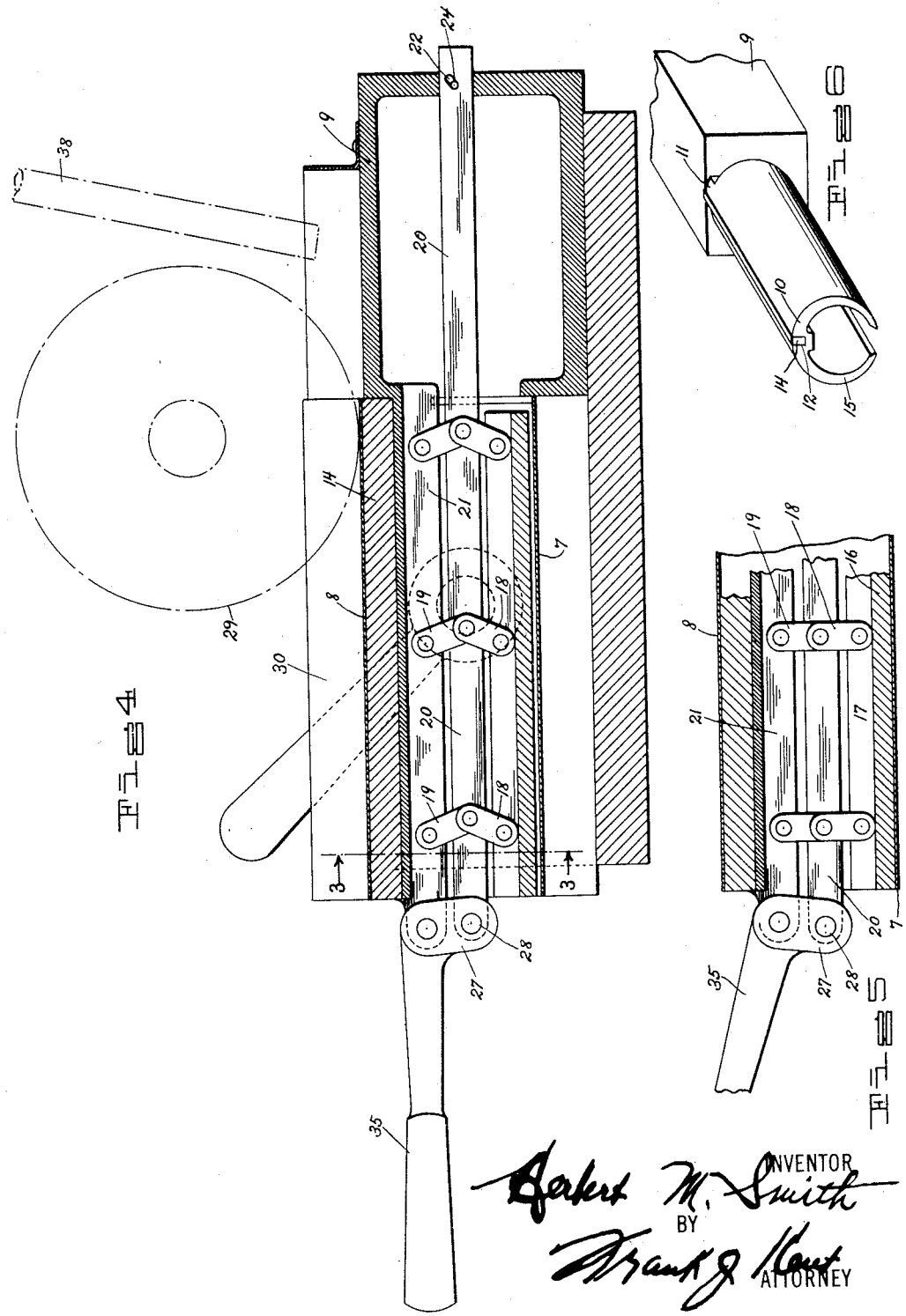

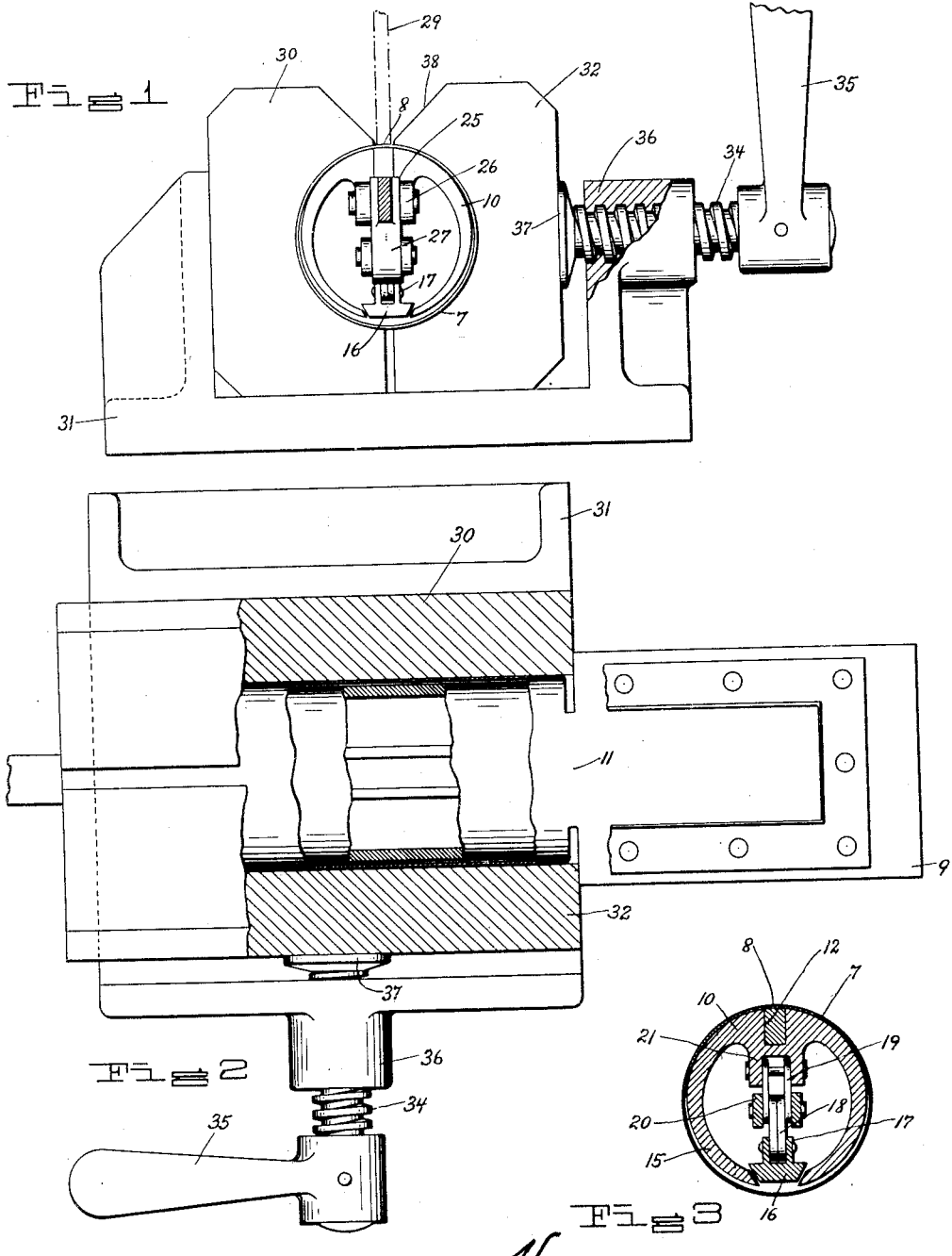

UNITED STATES PATENT OFFICE.

HERBERT M. SMITH, OF GREAT BARRINGTON, MASSACHUSETTS, ASSIGNOR TO STANLEY INSULATING COMPANY, OF GREAT BARRINGTON, MASSACHUSETTS, A CORPORATION OF MAINE.

MEANS FOR HOLDING FORMED METAL PIECES WHILE THEY ARE BEING ELECTRICALLY WELDED.

1,351,445.  Specification of Letters Patent.  Patented Aug. 31, 1920.

Application filed September 30, 1918. Serial No. 256,282.

*To all whom it may concern:*

Be it known that I, HERBERT MILLS SMITH, a citizen of the United States, residing at Great Barrington, in the county of Berkshire and State of Massachusetts, have invented certain new and useful Improvements in Means for Holding Formed Metal Pieces While They are Being Electrically Welded, of which the following is a specification.

This invention relates to apparatus for use in metal working and particularly the joining of metal parts by means of electric welding. It is for many technical purposes desirable to form up sheet metal into cylindrical or conical tubes or tubes of other shape or section and to weld the joint where the two edges of the sheet or sheets of metal meet each other. In many cases it is most desirable that the tubes or other preliminarily formed pieces shall be held very accurately to size during the welding operation, as in the case of metal parts of vacuum bottles, which have to fit accurately to other parts in order to be properly electrically welded at the fitted joint, or in the case of tubes for cartridges, shells and ammunition cases, which must accurately fit the bore of the gun in which they are to be fired.

The present invention constitutes an improved means of holding such tubes or other formed pieces of sheet metal exactly to size while the edges are being welded, while permitting easy insertion of the formed piece and removal of the finished work without possibility of damage either to the holding fixture or to the work by motion of the formed, and, or welded piece.

Another object is to provide such a means which is easily manipulated and controlled by the operator, which is made up of massive parts, not easily put out of order and which will perform its functions indefinitely without renewal or repair.

Other objects of the invention more or less broad than those referred to will be in part obvious and in part specifically referred to in the course of the following description of the elements, combinations and arrangements of parts going to make up the invention; and the scope of protection which I contemplate will appear from the claims.

In the accompanying drawings, which are to be taken as a part of this specification, and in which I have shown a merely preferred form of embodiment of the invention, Figure 1 is an end view of a holding device embodying the invention, with parts broken away and in section; Fig. 2 is a top plan view of the same, with parts broken away and in section; Fig. 3 is a sectional view taken on the line 3—3 of Fig. 4; Fig. 4 is a central vertical longitudinal view of the device shown in Fig. 1; Fig. 5 is a fragmentary view illustrating certain parts shown in Fig. 4 but in a different position; and Fig. 6 is a detail of the internal expanding mandrel.

The apparatus shown in the drawing is intended for holding during the welding operation, a tube of cylindrical form indicated at 7 rolled up from sheet metal and with its edges lapped or abutting as indicated at 8. For receiving and supporting this tubular blank I provide a mandrel shown in perspective in Fig. 6, comprising a hollow body 9, from which extends forwardly an integral member 10, having the general shape in cross section of the tubular member which it is to support. This member 10 comprises a longitudinally extending rigid portion integrally joined to the body 9 as indicated at 11 grooved out as indicated at 12 for the reception of a bar 14 of copper or other suitable conducting material. From this rigid backbone of the mandrel extend downwardly in opposite directions complementary wings 15 curved as shown in Fig. 6 to make up the general outline of a circle or tube and tapering in thickness toward their ends. The ends of these wings 15 do not meet each other, and on account of the construction they possess considerable resiliency. Obviously if a tube is slipped over this mandrel, large enough to just snugly fit, it will be tightly held in position if the ends of the wings 15 be driven away from each other and if, at the same time, the tube is exteriorly held. Such movement may be accomplished by the means shown, comprising a wedge member 16, adapted to be moved downwardly between the ends of the wings 15, thereby to cause their separation. This wedge member is elongated as shown in Figs. 4 and 5 to correspond with the length of the member 10 and is suspended by means of lugs 17 from links 18 which are embraced by and pivoted to the lugs 17. These links 18 are in turn pivotally connected to and between a series of pairs of links 19, one end of each pair of links 19 being pivotally secured to and between bars 20 extending longitudinally of the member 10, and the links 19 at their other ends being pivotally suspended between lugs 21 depending from the backbone of the member 10 (see Fig. 3). The bars 20 have at their rear ends cam slots 22 coöperating with pins 24, so that these bars 20 cannot be moved longitudinally without corresponding lateral movement. Such longitudinal and lateral movement will obviously result in movement down or up of the wedge member 16. In the Fig. 4 position of the parts the wedge member is up as in Fig. 3, while in the Fig. 5 position the wedge member has been driven down to spread the ends of the wings 15 apart, so that a tube which may have been easily slipped over the mandrel while the parts were in the Fig. 3 position, will be tightly held by the friction of the expanded mandrel. The movement of the wedge member is obtained by means of a lever 25 pivoted between lugs 26 at the front end of the mandrel and having a depending part 27, pivoted as indicated at 28 between the forward ends of the longitudinally movable bars 20. Of course when the tube blank is placed on the mandrel it will be so disposed that the overlapped or abutting edges 8 will overlie the copper bar 14, which constitutes one electrode in the welding process, the other being preferably a roller electrode indicated in dotted lines at 29, Fig. 4.

Coöperating with the internal expanding and contracting mandrel is an external holding means, which in the drawings takes the form of a heavy block of metal 30 firmly supported in a bed rock 31 and hollowed out to receive substantially one-half of the longitudinal section of the mandrel. Coöperating with this stationary block 30 and embracing substantially the other half section of the mandrel is a similar but movable block 32, which is moved toward and from the mandrel and the complementary block 30 by means of a threaded rock shaft 34, operated by means of lever 35, extending through a threaded bracket 36 upstanding from the bed 31 and fast, as indicated at 37, to the block 32. The blocks 30 and 32 are, each of them, beveled as indicated at 38 downwardly toward the inclosed mandrel and are cut away so that they do not closely approach each other at the top, but leave a space extending longitudinally between them, above and corresponding to the copper bar 14 of the mandrel. In this space travels the roller electrode 29 during the operation of welding a tube held upon the mandrel and within the blocks 30 and 32.

In operation, when it is desired to place a tube which is to be welded in position, the lever 35 is moved so as to separate the block 32 from its partner 30 and the lever 35 is moved to the Fig. 4 position, that is to say, the wedge member 16 is moved up, leaving the ends of the wings 15 free to approach each other under the influence of their normal resiliency. The tubular blank 7 is now slipped on over the mandrel, between the mandrel and the surrounding blocks 30 and 32, with the edge portions of the tube which are to be welded longitudinally disposed immediately above the copper or other conducting bar 14. The handle 35 is now turned to move the block 32 toward the block 30, thereby closely engaging the tubular blank 7 externally and then the handle 35 is operated to bring the parts of the mandrel to the Fig. 5 position, in which the wedging member 16 drives down between and separates the ends of the wings 15, thereby frictionally gripping the tubular blank internally. The blank is now frictionally held both internally and externally, except for a very narrow strip at the top along which the welding is to take place, and there is no danger of the edges springing apart or of the tube losing its shape during the welding operation.

The links 18 and 19 and bars 20 constitute toggles, so that the action of the mandrel expander is very positive and powerful and is not likely to get out of order, and as soon as the toggle is operated to bring the parts to the Fig. 4 position the mandrel collapses or contracts by its own spring. Of course it will be understood that instead of providing a mandrel which is unitary it might be made up of several sections connected together by suitable joints, which sections would be drawn together and forced apart radially. It will also be evident that some other form of coöperating external gripping means might be employed. If desired also I may provide for conducting a stream of water or other cooling liquid along the path of the weld, a water supply pipe being indicated at 38 in Fig. 4, the space between the tapered portions 38 of the blocks 30 and 32 forming a natural channel whose bottom is the exposed portion of the tube under treatment.

It is evident that if the mandrel or arbor were not made contractible it would be very difficult to remove the welded shell from it. In such a case the removal would require the use of a stripper or other similar device, because of friction due to the extremely tight fit of the shell on the mandrel when held accurately to size. The well-known difficulty of stripping a tight fitting shell from a mandrel, particularly if the mandrel be composed of the relatively soft metals (copper or its alloys) preferably used for welding conductors, make the use of an expanding and contracting mandrel an important improvement in the art. In some cases I prefer to provide a single lever with connections to the parts of both the expanding and contracting mandrel and the movable part or parts of the outside clamped device, so that upon the movement of this single lever in one direction the mandrel contracts and the outside clamping devices separate from each other, and upon another movement of the lever the mandrel expands against the interior of the tube while the outside clamping devices approach each other and grip the tube between them.

I claim:—

1. A means for holding formed metal pieces while being electrically welded, including an expansible and contractible mandrel, which in its expanded position assumes the exact desired internal size and shape of the finished shell, and suitable jaws movable relatively to each other for engaging the exterior of the shell while welding, said jaws being designed to assume at their bearing surface the exact external size and shape of portions of the desired finished shell, the arbor in its contracted position and the jaws in their removed position permitting easy insertion and removal of the formed metal piece before or after welding.

2. A means for holding formed metal pieces while being electrically welded, including an expansible and contractible mandrel, which in its expanded position assumes the exact desired internal size and shape of the finished shell, and suitable jaws movable relatively to each other for engaging the exterior of the shell while welding, said jaws being designed to assume at their bearing surface the exact external size and shape of portions of the desired finished shell, the arbor in its contracted position and the jaws in their removed position permitting easy insertion and removal of the formed metal piece before or after welding, the mandrel having a longitudinal inserted bar of good conducting material and the jaws surrounding the mandrel being cut away to correspond with said bar so that when a tube is clamped in position on the mandrel and between the jaws the edge portions of the shell to be welded are exposed.

3. A means for holding formed metal pieces while being electrically welded, including an expansible and contractible mandrel, which in its expanded position assumes the exact desired internal size and shape of the finished shell, and suitable jaws movable relatively to each other for engaging the exterior of the shell while welding, said jaws being designed to assume at their bearing surface the exact external size and shape of portions of the desired finished shell, the arbor in its contracted position and the jaws in their removed position permitting easy insertion and removal of the formed metal piece before or after welding; the mandrel normally tending to a contracted state by the inherent resiliency of its parts and being provided with means for positively overcoming this tendency.

4. A means for holding formed metal pieces while being electrically welded, including an expansible and contractible mandrel, which in its expanded position assumes the exact desired internal size and shape of the finished shell, and suitable jaws movable relatively to each other for engaging the exterior of the shell while welding, said jaws being designed to assume at their bearing surface the exact external size and shape of portions of the desired finished shell, the arbor in its contracted position and the jaws in their removed position permitting easy insertion and removal of the formed metal piece before or after welding, the mandrel having a longitudinal inserted bar of good conducting material and the jaws surrounding the mandrel being cut away to correspond with said bar so that when a tube is clamped in position on the mandrel and between the jaws the edge portions of the shell to be welded are exposed, the cut-away portions of the surrounding jaws when closed upon the piece under treatment, coöperating with the exposed surface of the piece to form a channel for a cooling liquid.

5. A means for holding formed metal pieces while being electrically welded, including an expansible and contractible mandrel, which in its expanded position assumes the exact desired internal size and shape of the finished shell, and suitable jaws movable relatively to each other for engaging the exterior of the shell while welding, said jaws being designed to assume at their bearing surface the exact external size and shape of portions of the desired finished shell, the arbor in its contracted position and the jaws in their removed position permitting easy insertion and removal of the formed metal piece before or after welding, the mandrel normally tending to a contracted state by the inherent resiliency of its parts and being provided with lugs formed on the interior of the mandrel and toggle means suspended from the lugs for positively overcoming this tendency.

6. A means for holding formed metal pieces while being electrically welded, including an expansible and contractible mandrel, which in its expanded position assumes the exact desired internal size and shape of the finished shell, and suitable jaws movable relatively to each other for engaging the exterior of the shell while welding, said jaws being designed to assume at their bearing surface the exact external size and shape of portions of the desired finished shell, the arbor in its contracted position and the jaws in their removed position permitting easy insertion and removal of the formed metal piece before or after welding, the mandrel normally tending to a contracted state by the inherent resiliency of its parts, lugs formed on the interior of the mandrel and a wedge member suspended from the lugs and being movable to engage the mandrel and thereby positively overcome the contracted tendency.

7. A means for holding formed metal pieces while being electrically welded, including a mandrel having a forward expansible and contractible split extension, which extension in its expanded position assumes the exact desired internal size and shape of the finished shell, and suitable jaws movable relatively to each other for engaging the exterior of the shell while welding, said jaws being designed to assume at their bearing surface the exact external size and shape of portions of the desired finished shell, the arbor in its contracted position and the jaws in their removed position permitting easy insertion and removal of the formed metal piece before or after welding, the extension normally tending to a contracted state by the inherent resiliency of its parts, said extension having a toggle mechanism suspended therein including pivoted links, an intermediate bar, one end of said bar extending within the mandrel and having sliding engagement therewith, a wedge member connected to the links and adapted to engage the split portion of the extension and a handle for operating the toggle whereby the wedge member is brought into engagement with the split portion of the extension to cause the extension to be expanded.

In testimony whereof I affix my signature.

HERBERT M. SMITH.